Patented Oct. 8, 1935

2,016,963

UNITED STATES PATENT OFFICE 2,016,963

PRODUCT COMPRISING GLUCAMINES AND RELATED SUBSTANCES

Robert B. Flint and Paul L. Salzberg, Wilmington, Del., assignors to E. I. du Pont de Nemours & Company, Wilmington, Del., a corporation of Delaware No Drawing. Application September 27, 1932, Serial No. 635,047

9 Claims. (Cl. 260—127)

This invention relates to new chemical compositions, and it pertains particularly to the class of compounds known as alkyl glucamines.

An object of the invention pertains to the preparation of compounds corresponding to the formula

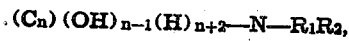
$(C_n)(OH)_{n-1}(H)_{n+2}-N-R_1R_2$, in which $n$ is 5 or 6, $R_1$ is a saturated open-chain aliphatic radical, $R_2$ is hydrogen or a saturated open-chain aliphatic radical and the polyhydroxy aliphatic radical attached to the nitrogen is either a normal or a branched radical.

A preferred method of preparing the new compositions comprising the subject matter of this invention comprises reacting a sugar containing 5 or 6 carbon atoms, and either of the aldose or ketose type, with a primary or secondary amine and hydrogen, under elevated pressure and at elevated temperature, in the presence of a hydrogenating catalyst.

The following examples, which are illustrative only, and which are not to limit the scope of the invention describe the preferred process for making the new compounds:

Example 1

One hundred grams of commercial glucose, 80 grams of water and 80 grams of monomethylamine were charged into a pressure vessel with 9 grams of a reduced nickel catalyst comprising 20% reduced nickel supported on kieselguhr. Hydrogen was introduced to a pressure of 2000 lbs. and the vessel was agitated vigorously during the heating. Hydrogen absorption began at 100° C. and was complete in 15 minutes, the temperature attaining a maximum of 120° C. during this time. The product was separated from the catalytic material by filtration and the filtrate evaporated until crystallization occurred. Methylglucamine could be recrystallized from this residue as a white solid melting at 127°–128° C.

Example 2

Seventy-five grams of commercial glucose and 200 cc. of 30% aqueous dimethylamine solution were charged into a pressure vessel with seven grams of a reduced nickel catalyst comprising 20% reduced nickel supported on kieselguhr. Hydrogen was introduced to a pressure of 2000 lbs. and the vessel was agitated vigorously while being heated. Hydrogen absorption began at 105° C. and was complete in 10 minutes, the temperature attaining a maximum of 120° C. during this time. The product was separated from the catalytic material by filtration and the filtrate evaporated. A viscous syrup of basic nature was obtained as reaction product.

Example 3

One hundred grams of xylose and 100 grams of monomethylamine dissolved in 100 grams of water were charged into a pressure vessel at approximately room temperature with 10 grams of a reduced nickel catalyst comprising 20% of reduced nickel supported on kieselguhr. Hydrogen was introduced to a pressure of 2000 pounds and the vessel and the mixture gradually heated with vigorous agitation. Hydrogen absorption began at 90° C. and was complete in 45 minutes, the temperature attaining a maximum of 100° C. during this time. The product was separated from the catalytic material by filtration and the filtrate evaporated. Methylxylamine was obtained as a viscous, non-crystalline syrup which by titration with hydrochloric acid gave a molecular weight of 168 as compared with a calculated molecular weight of 165.

Example 4

Fifty grams xylose, 98 grams of monobutylamine, 70 grams of water and 5 grams of a catalyst comprising 20% reduced nickel supported on kieselguhr were shaken vigorously in a pressure vessel under 1800 pounds hydrogen pressure. When heat was applied, absorption of hydrogen began at 90° C. and was complete in 50 minutes with the temperature reaching a maximum of 100°. The product was separated from the catalytic material by filtration and the filtrate evaporated. Butylxylamine was obtained as a viscous, non-crystalline syrup which by titration with HCl gave a molecular weight of 213 as compared with a calculated molecular weight of 207.

Example 5

Eighty-four grams of commercial glucose, 228 grams of 33% aqueous monoethylamine solution and 8 grams of a catalyst comprising 20% reduced nickel supported on kieselguhr were shaken vigorously in a pressure vessel under 1500 pounds hydrogen pressure. When heat was applied, absorption of hydrogen began at 90° and was complete in two hours with the temperature reaching a maximum of 100° C. The product was separated from the catalytic material by filtration and the filtrate evaporated. Ethyglucamine was obtained as a white crystalline solid melting at 133–134° C., which by titration with hydrochloric acid, gave a molecular weight of 209, which is the calculated value.

Example 6

One hundred grams of commercial glucose, 94 grams of monoethanolamine, 94 grams of water and 10 grams of a nickel catalyst comprising 20% reduced nickel supported on kieselguhr were shaken vigorously in a pressure vessel under 2000 pounds hydrogen pressure. When heat was applied absorption of hydrogen began at 90° C. and was complete in 45 minutes with the temperature reaching a maximum of 110° C. The product was separated from the catalytic material by filtration and the filtrate evaporated. Hydroxyethylglucamine was obtained as a viscous, non-crystalline syrup.

Example 7

One hundred grams of galactose, 80 grams of monomethylamine, 80 grams of water and 10 grams of a catalyst comprising 20% reduced nickel supported on kieselguhr were shaken vigorously in a pressure vessel under 2300 pounds hydrogen pressure. When heat was applied, absorption of hydrogen began at 55° C. and was complete in 45 minutes with the temperature reaching a maximum of 80° C. The product was separated from the catalytic material by filtration and the filtrate evaporated. Methylgalactamine was obtained as a white crystalline solid melting at 127–128° C.

Example 8

One hundred grams of crystalline fructose, 80 grams of monomethylamine, 80 grams of water and 10 grams of a catalyst comprising 20% reduced nickel supported on kieselguhr were shaken vigorously in a pressure vessel under 1700 pounds hydrogen pressure. When heat was applied, absorption of hydrogen began at 80° C. and was complete in 75 minutes with the temperature reaching a maximum of 100°. The product was separated from the catalytic material by filtration and the filtrate evaporated. Methylfructamine was obtained as a viscous, non-crystalline syrup.

Under the general conditions of the above examples, a similar process can be carried out by using in place of glucose any other sugar containing 5 or 6 carbon atoms and containing either a ketone or an aldehyde group. Thus in place of glucose may be substituted mannose, and related sugars.

Saturated aliphatic amines which can be used in place of monomethyl and dimethylamine illustrated in the above examples, are monoethyl and diethylamine, monopropyl and dipropylamine, monobutyl and dibutylamine, the mono and diamines of the higher saturated aliphatic type such as dodecylamine or octadecylamine, phenylethylamine, monobenzyl and dibenzylamine, and any other mixed aryl alkyl amines.

The process is preferably carried out by dissolving the sugar in the aliphatic amine, or by dissolving sugar in aqueous or alcoholic solution and then adding the amine, or by dissolving the amine in water or alcoholic solution and then adding the sugar, or by dissolving both the sugar and amine in water or in alcoholic solution. Other solvents than water or alcohol can be used if desired.

The temperature for the reaction is preferably maintained between 50° and 200° C., and usually runs between 80° and 125° C. Temperatures considerably below 80° C. give lower reduction rates, while temperatures above 125° C. usually cause caramelization. The use of moderately high pressures is advantageous because it increases the rate of hydrogenation. It is preferred to operate between 700 and 2000 lbs. per sq. in., but much lower pressures, for example, pressures as low as 225 lbs. per sq. in. can be successfully employed. The upper pressure is, of course, limited only by the strength of the reaction vessel.

Good contact between the reactants and the catalyst is essential. This may be effected by internal stirring, as in an autoclave, or the entire vessel may be agitated externally. Any method whereby the gas, liquid, and catalyst are brought into intimate contact will expedite the reaction.

It is preferable to use a substantial excess of amine over the theoretical amount required in order to insure complete reaction with the carbonyl compound and avoid side reactions, e. g. sorbitol formation. Concentrations of amines in aqueous or alcoholic solution other than those given or pure amines in the absence of a solvent may be used. It is preferred to use about a 50% concentration of amine in a solvent, for example, a 50% aqueous solution of monomethylamine.

The catalysts used may be unsupported, but catalysts prepared by reduction of the metals are usually rather easily sintered during the reduction step with resultant loss in activity. It is preferable, therefore, to use catalysts precipitated on any of the well known supporting materials, such as pumice, silica gel, carbon, kieselguhr, fuller's earth, etc.

Amino alcohols comprising the present invention may be used as dye assistants, as ingredients for wetting agents for viscose or acetate rayon, as textile lubricants in mineral oil emulsions, in auto and lacquer polishes, as absorbents for carbon dioxide and hydrogen sulfide in the purification of industrial gases, for softening and cleaning skins, for softening hides, and in other uses where amino compounds are desirable.

While the reaction between the sugar and the amine and hydrogen constitutes the preferred form of preparing the new compositions, they may also be prepared by other methods. Thus, under certain conditions glucamine may be alkylated by reacting with an alkyl halide such as ethyl chloride, or bromide, or with an alkyl sulfate, such as dimethyl or diethyl sulfate, at room temperature or slightly elevated temperature, but this process is generally less satisfactory for the preparation of pure mono-alkyl glucamines. Another alternative method comprises reacting glucamine with an aldehyde such as formaldehyde or acetaldehyde at room or slightly elevated temperature followed by or accompanied by reduction with hydrogen in the presence of a nickel catalyst, preferably at slightly elevated temperature and under elevated pressure.

The above description and examples are to be taken as illustrative only and not as limiting the scope of the invention. Any modification or variation therefrom which conforms to the spirit of the invention is intended to be included within the scope of the claims.

We claim:

1. A compound having the formula

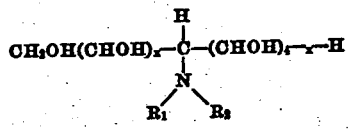

in which $x$ is 3 or 4, $R_1$ is a saturated open-chain aliphatic radical, and $R_2$ is hydrogen or a saturated open-chain aliphatic radical.

2. The compound of claim 1 in which R₂ is hydrogen.
3. The compound of claim 1 in which $x$ is 3.
4. The compound of claim 1 in which $x$ is 4.
5. An alkyl glucamine.
6. A methyl glucamine.
7. An alkyl xylamine obtainable by the hydrogenation of xylose with an aliphatic amine.
8. Monomethyl glucamine, a white crystalline compound melting at approximately 127°–128° C.
9. Monoethyl glucamine, a white crystalline compound melting at approximately 133°–134° C.

ROBERT B. FLINT.
PAUL L. SALZBERG.